United States Patent Office 2,836,542
Patented May 27, 1958

2,836,542

PROCESS OF PRODUCTION OF CRYSTALLINE INSULIN

Karl Petersen, Copenhagen, and Jörgen Schlichtkrull, Holte, Denmark, assignors to Novo Terapeutisk Laboratorium A/S, Copenhagen, Denmark, a company of Denmark No Drawing. Application February 9, 1953
Serial No. 336,017

Claims priority, application Denmark February 13, 1952

4 Claims. (Cl. 167—75)

Insulin was for the first time produced in crystalline form by Abel, vide for example Proc. Nat. Acad. Sci. 12, 132 (1926), by using a mixture of ammonium acetate, brucine and pyridine as a crystallization medium, and later in 1929 by Harrington and Scott, vide Biochem. J. 23, 384 (1929), from amorphous insulin by using a saponin-containing ammonium acetate buffer, the pH value of the insulin solution in both cases being changed to approximate the isoelectric point of the insulin in order to produce crystallization. These methods of crystallization, which gave rather modest yields of rather impure crystals, have however later been abandoned in preference to the method of crystallization as developed by Scott, vide Biochem. J. 28, 1952 (1934), and the U. S. A. patent specification No. 2,143,590.

Scott's method of crystallization is based on the surprising observation that it is necessary in order to obtain an absolutely reproduceable crystallization and high yields that a certain amount of one of the metals zinc, cadmium, cobalt and nickel is present in the crystallization medium. When one formerly had succeeded in crystallizing insulin, the reason was that the crystallization medium by nature contained zinc, and Scott found that it was a prerequisite for the crystallization that the crystallization medium contained $A \times 0.007$ gram of one of the mentioned metals per 100 grammes dry insulin, "A" denoting the atomic weight of the metal.

The present invention, relating to a process of the type in which insulin is brought to crystallize from a medium, containing cations prerequisite for crystallization, by changing the pH value of the medium to approximate the isoelectric point of the insulin, is based on the observation that zinc, cadmium, cobalt and nickel are not the only metals which are prerequisite for crystallization of the insulin, but that also the metals copper, manganese and iron possess this property, when they are present in divalent form.

The process according to the invention is thus characteristic in that cupric ions, manganous ions or ferrous ions or mixtures of such ions are employed as cations prerequisite for crystallization.

While it thus hitherto has been necessary to crystallize insulin by means of the metals mentioned by Scott, in practice exclusively zinc, the present invention makes it possible to effect crystallization with other metals, involving an enrichment of the art.

As is well known the metals mentioned by Scott are taken up by the insulin crystals, which thus will come to contain zinc, cadmium, cobalt or nickel. In a corresponding manner the insulin crystals produced according to the invention will come to contain copper, manganese or iron, and on the basis of these new crystals it is possible to produce insulin preparations with modified therapeutic activity.

Provided the insulin solution employed does not beforehand contain cations prerequisite for crystallization, for example zinc, which, as is well-known, is present in the pancreas, from which the insulin is recovered, the metal ions employed according to the invention should be present in the crystallization medium in an amount of over 0.5% of the weight of the insulin. However, in the neighbourhood of this lower limit crystallization takes place comparatively slowly, whilst the yields of crystals is also less satisfactory. Hence, in practice it is preferable to employ considerably larger amounts of metals.

If the crystallization is effected exclusively on the basis of copper the crystallization medium should show a cupric ion concentration of at least 0.01%. The corresponding figure is for manganous ions 0.1% and for ferrous ions 0.05%.

However, the best results are obtained with somewhat larger amounts of metals, viz. 0.05–0.1% copper, 0.1–0.2% iron and 0.2–0.5% manganese, respectively. Concentrations of the metal ions which are more than 2–3 times as great as the last mentioned will as a rule be inexpedient. In practice, the copper concentration should not exceed 0.5%. The corresponding figure is for manganese 0.8% and for iron 0.5%. Provided that more than one of the metals in question are present in the crystallization medium, or that this by nature contains or by its production is made to contain cations prerequisite for crystallization, the added amount of each metal may of course be reduced correspondingly.

The insulin concentration may vary within wide limits, though, however, it is most appropriate to employ an insulin concentration between 0.1 and 1%.

It is not critical for the invention in which form the metals in question are added to the crystallization medium, if only the metals are present in ionogenic form under the conditions of crystallization. Usually it is most practical to add the metals in form of their salts, such as sulphates, nitrates, chlorides, acetates, citrates etc. If the crystallization medium is acid at the time of addition the metals may also be employed in form of their hydroxides or other compounds from which the metals are liberated in ionogenic form in an acid medium. Furthermore, it should be noted that the metals may also be present as complex ions if only the metal can be taken up by insulin during the crystallization.

In carrying out the process according to the invention the solution, which is the result of the technical recovery of the insulin, and which hitherto has been employed for production of crystalline insulin in the presence of zinc ions, may be utilized as insulin solutions. However, it is also possible to start with amorphous insulin as found on the market, in which case the amorphous insulin is brought into solution in the usual manner in an aqueous solution of an acid, for example hydrochloric acid, sulphuric acid or phosphoric acid.

As is well known, technical insulin solutions and amorphous insulin produced thereof contain small amounts of zinc originating from the pancreas. Consequently, if it is desirable to produce zinc free insulin crystals, the zinc, present by nature, must first be removed, for example by dialysis.

It is preferable that the insulin solution employed has a pH value below the isoelectric point of the insulin (pH about 5.5), but insulin solutions having a pH value over the isoelectric point, for example pH 8, may also be employed.

The yields obtained by the process according to the invention are dependent on the degree of purity of the insulin employed. Insulin solutions, in which the insulin exhibits a boilogic activity under 15 international units per milligram, will as a rule give a less satisfactory yield. The best yields are obtained when the insulin is completely pure, i. e. exhibits a biologic activity of 22–23 international units per milligram.

As known, the crystallization of insulin usually takes place in presence of a buffer substance for maintaining the most favourable pH value during the crystallization. It is advantageous to make use of buffer substances also in carrying out the process according to the invention. As examples of useful buffer substances may be mentioned acetate buffer, borate buffer, citrate buffer, diethyl barbiturate buffer, phosphate buffer, maleate buffer or mixtures hereof. Among these buffer substances it is preferable to employ citrate buffers, since hereby a quick crystallization is obtained and insulin crystals are formed with a smaller content of ash substances and coloured organic impurities than with the use of the other buffer substances.

In the crystallization of insulin hitherto known use has also been made of an addition of crystallization promoting organic solvents, such as acetone, propyl alcohol, butyl alcohol or amyl alcohol. It is also advantageous in the process according to the invention to use an addition to one or more of such organic solvents, preferably acetone.

In the preparation of the metal containing insulin solution the required starting materials are admixed in solid or dissolved form, while the necessary amount of a base or acid solution for bringing the insulin into solution may be added, if desired. However, generally it will be most practical to use the starting substances in dissolved form, at any rate insofar as the metals and buffer substances are concerned, which facilitates the dosing of these substances.

When an insulin solution has been produced containing one or more of the mentioned metal ions as well as if desired, a buffer substance and a crystallization promoting organic solvent, crystallization of the insulin is effected by changing the pH value of the solution to approximate the isoelectric point of the insulin. The range of the pH value in which the insulin may be brought to crystallize, is lying between pH 5 and pH 7.

In the case of an insulin solution with a pH value below the above mentioned range, for example, a pH value of 2–4, the pH value is increased by the addition of an anqueous solution of an alkaline reacting substance, preferably a hydroxide and particularly an alkali metal hydroxide. In the case of an insulin solution with a pH value over the above mentioned pH range, the pH value of the solution is decreased by the addition of an aqueous acid solution, for example of a diluted acid such as acetic acid, hydrochloric acid, sulphuric acid or phosphoric acid.

The following examples of performance serve to further elucidate the process according to the invention.

*Example I*

300 millilitres of a cupric chloride solution containing 1.34 grams $CuCl_2.2H_2O$ are added to 5 grams of amorphous insulin (approximately 23 international units per milligram), after which the insulin is brought into solution by the addition of 5 millilitres 1 n hydrochloric acid, 150 millilitres of acetone and 500 millilitres of citrate buffer, containing 10 grams of citric acid and 5.6 grams of sodium hydroxide, are then added, after which the pH value of the solution is adjusted to approximately 6.0. After some hours the crystallization is accomplished. The insulin crystals are removed by suction and washed first with water and then with acetone after and then dried. They contain about 0.37% Cu.

*Example II*

The procedure is as in Example I, employing 300 millilitres of a manganese chloride solution, containing 7.22 grams $MnCl_2.4H_2O$, instead of the cupric chloride solution. The dried insulin crystals contain about 0.38% Mn.

*Example III*

The procedure is as in Example I, however, employing 300 millilitres of a ferrous chloride, containing 5.37 grams $FeCl_2.4H_2O$, instead of the cupric chloride solution. The dried insulin crystals contain about 0.30% Fe.

*Example IV*

The following basic solutions are produced:
A. An aqueous solution (pH approximately 6.5) of amorphous crude insulin from swine pancreas, containing approximately 7.5 grams of insulin per litre, 16–17% of acetone and 1.1% of citric acid.
B. An aqueous solution, containing 0.56%
$MnSO_4.4H_2O$ 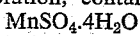
C. An aqueous solution, containing 0.70%
$FeSO_4.7H_2O$ 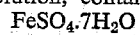
D. An aqueous solution, containing 0.63%
$CuSO_4.5H_2O$ 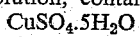
E. An aqueous solution, containing 4% citric acid and adjusted to pH approximately 7 with sodium hydroxide.

(1) 4 millilitres of acetone, 20 millilitres of solution B and 7 millilitres of solution E are added to 50 millilitres of solution A. The pH value is reduced to approximately 6.4 with hydrochloric acid, and the mixture is kept for 15 hours at approximately 4° C.

The insulin crystals formed are removed by suction, washed first with water and then with acetone and dried.

(2) 4 millilitres of acetone, 20 millilitres of solution C and 7 millilitres of solution E are added to 50 millilitres of solution A. The pH value of the solution is reduced to 6.05 with hydrochloric acid, and the compound is allowed to stand for 15 hours at 4° C.

The insulin crystals thus formed are separated, first washed with water and then with acetone and dried.

(3) 4 millilitres of acetone, 20 millilitres of solution D and 7 millilitres of solution E are added to 50 millilitres corresponding to solution A, but produced on the basis of pure amorphous zincfree insulin. The pH value of the solution is reduced to 6.03 with hydrochloric acid, and the compound is allowed to stand for 15 hours at about 4° C. The insulin crystals thus formed are separated, first washed with water and then with acetone and dried. The insulin crystals contain approximately 0.34% copper and no zinc.

*Example V*

2000 millilitres of distilled water and 200 millilitres of normal hydrochloric acid are added to 2500 millilitres of a phosphate buffer, produced by dissolution of 335 grams $Na_2HPO_4.12H_2O$ and 55 grams $KH_2PO_4$ in 20 litres of distilled water, after which 200 millilitres of an insulin solution are added, containing 30 milligrams of insulin per millilitre and 500 millilitres of an cupric chloride solution, produced by dissolution of 26.8 grams of $CuCl_2.2H_2O$ in 1 litre of distiller water, and 500 millilitres of acetone. The pH value of the compound is then adjusted to 6.2 by adding approximately 230 millilitres of normal $NH_4OH$. Crystallization of the insulin occurs in a few hours, and the crystals are separated after a few days.

Having thus fully described our invention we claim as new and desire to secure by Letters Patent:

1. A process of producing insulin crystals which consists essentially of preparing an aqueous medium containing insulin in non-crystalline form and divalent ions of at least one of the metals selected from the group consisting of copper, manganese and iron, and adjusting the pH of said medium to a valve within the range of 5 to 7, said divalent ions being present in said aqueous medium in an amount above 0.5% by weight of the insulin such that insulin crystals containing said metals are precipitated upon the adjustment of said pH of said medium to said valve.

2. A process as defined in claim 1, wherein the medium has a cupric ion content of 0.01 to 0.5% by weight.

3. A process as defined in claim 1, wherein the medium has a manganous ion content of 0.1 to 0.8% by weight.

4. A process as defined in claim 1, wherein the medium has a ferrous ion content of 0.05 to 0.5% by weight.

References Cited in the file of this patent

UNITED STATES PATENTS

| | | |
|---|---|---|
| 2,161,198 | Reiner | June 6, 1939 |
| 2,354,211 | Lang et al. | July 25, 1944 |
| 2,787,575 | Homan | Apr. 2, 1957 |

OTHER REFERENCES

Santi: Bolletino Della Societa Italiana Di Biologia Sperimentale, vol. 17, No. 2, February 1942, pp. 88–89.

Sahyun: J. of Biological Chemistry, vol. 117, No. 2, February 1937, pp. 685–691.